United States Patent
Citron et al.

(10) Patent No.: US 8,588,389 B2
(45) Date of Patent: Nov. 19, 2013

(54) SYSTEM FOR EFFECTING A TELEPHONE CALL OVER A COMPUTER NETWORK WITHOUT ALPHANUMERIC KEYPAD OPERATION

(71) Applicant: Vonage Network LLC, Holmdel, NJ (US)

(72) Inventors: Jeffrey Citron, Brielle, NJ (US); Andrew Wason, Atlantic Highlands, NJ (US); Nilesh Shah, Monmouth, NJ (US)

(73) Assignee: Vonage Network LLC, Holmdel, NJ (US)

( * ) Notice: Subject to any disclaimer, the term of this patent is extended or adjusted under 35 U.S.C. 154(b) by 0 days.

(21) Appl. No.: 13/686,716

(22) Filed: Nov. 27, 2012

(65) Prior Publication Data
US 2013/0089192 A1      Apr. 11, 2013

Related U.S. Application Data

(63) Continuation of application No. 12/494,141, filed on Jun. 29, 2009, now Pat. No. 8,320,543, which is a continuation of application No. 11/081,174, filed on Mar. 16, 2005, now abandoned.

(51) Int. Cl.
*H04M 3/42* (2006.01)
(52) U.S. Cl.
USPC ............................. 379/201.01; 370/352
(58) Field of Classification Search
USPC ............ 379/201.01, 201.07, 242, 216, 379/355.01–355.1, 189; 370/352
See application file for complete search history.

(56) References Cited

U.S. PATENT DOCUMENTS

| | | | |
|---|---|---|---|
| 4,100,377 A | 7/1978 | Flanagan | |
| 4,748,620 A | 5/1988 | Adelmann et al. | |
| 4,782,485 A | 11/1988 | Gollub | |
| 5,018,136 A | 5/1991 | Gollub | |
| 5,444,707 A | 8/1995 | Cerna et al. | |
| 5,452,289 A | 9/1995 | Sharma et al. | |
| 5,526,353 A | 6/1996 | Henley et al. | |
| 5,623,490 A | 4/1997 | Richter et al. | |
| 5,966,427 A | 10/1999 | Shaffer et al. | |
| 5,995,491 A | 11/1999 | Richter et al. | |
| 6,014,437 A | 1/2000 | Acker et al. | |
| 6,067,516 A | 5/2000 | Levay et al. | |
| 6,084,956 A | 7/2000 | Turner et al. | |
| 6,091,808 A | 7/2000 | Wood et al. | |

(Continued)

OTHER PUBLICATIONS

European Office Action dated Apr. 9, 2013 for Application No. 06 738 502.1-1858.

(Continued)

*Primary Examiner* — Joseph J Nguyen
(74) *Attorney, Agent, or Firm* — Moser Taboada; Joseph Pagnotta

(57) ABSTRACT

A system for effecting a telephone call between telephonic devices is operative to use a computer network, without manual use of the alphanumeric keypads. A third party call control (3PCC) application program interface (API) provides the capability for users to use a web browser or other Internet capable software to place a call, rather than using the telephone keypad. A third party call control application program interface includes a uniform resource locator operable over the Internet to cause a call between a first telephonic device and a second telephonic device to be completed. The uniform resource locator includes identification of the first telephonic device and identification of the second telephonic device.

4 Claims, 3 Drawing Sheets

(56) References Cited

U.S. PATENT DOCUMENTS

| | | | |
|---|---|---|---|
| 6,097,804 A | 8/2000 | Gilbert et al. |
| 6,104,706 A | 8/2000 | Richter et al. |
| 6,115,460 A | 9/2000 | Crowe et al. |
| 6,115,468 A | 9/2000 | DeNicolo |
| 6,118,860 A | 9/2000 | Hillson et al. |
| 6,122,364 A | 9/2000 | Petrunka et al. |
| 6,128,379 A | 10/2000 | Smyk |
| 6,137,869 A | 10/2000 | Voit et al. |
| 6,138,072 A | 10/2000 | Nagai |
| 6,167,042 A | 12/2000 | Garland et al. |
| 6,169,741 B1 | 1/2001 | LeMaire et al. |
| 6,175,565 B1 | 1/2001 | McKinnon et al. |
| 6,178,239 B1 | 1/2001 | Kishinsky et al. |
| 6,185,285 B1 | 2/2001 | Relyea et al. |
| 6,188,762 B1 | 2/2001 | Shooster |
| 6,195,425 B1 | 2/2001 | Farris |
| 6,226,286 B1 | 5/2001 | Danne et al. |
| 6,226,361 B1 | 5/2001 | Koyama |
| 6,243,443 B1 | 6/2001 | Low et al. |
| 6,249,576 B1 | 6/2001 | Sassin et al. |
| 6,266,405 B1 | 7/2001 | Madour et al. |
| 6,272,126 B1 | 8/2001 | Strauss et al. |
| 6,282,281 B1 | 8/2001 | Low |
| 6,282,284 B1 | 8/2001 | Dezonno et al. |
| 6,292,553 B1 | 9/2001 | Fellingham et al. |
| 6,298,064 B1 | 10/2001 | Christie |
| 6,304,572 B1 | 10/2001 | Christie |
| 6,304,637 B1 | 10/2001 | Mirashrafi et al. |
| 6,304,653 B1 | 10/2001 | O'Neal et al. |
| 6,310,941 B1 | 10/2001 | Crutcher et al. |
| 6,311,182 B1 | 10/2001 | Colbath et al. |
| 6,320,951 B1 | 11/2001 | Shtivelman et al. |
| 6,327,572 B1 | 12/2001 | Morton et al. |
| 6,330,317 B1 | 12/2001 | Garfinkel |
| 6,337,899 B1 | 1/2002 | Alcendor et al. |
| 6,343,115 B1 | 1/2002 | Foladare et al. |
| 6,349,132 B1 | 2/2002 | Wesemann et al. |
| 6,351,464 B1 | 2/2002 | Galvin et al. |
| 6,351,526 B1 | 2/2002 | Shaffer et al. |
| 6,366,577 B1 | 4/2002 | Donovan |
| 6,366,661 B1 | 4/2002 | Devillier et al. |
| 6,373,836 B1 | 4/2002 | Deryugin et al. |
| 6,373,936 B1 | 4/2002 | Raniere et al. |
| 6,373,938 B1 | 4/2002 | Palacios et al. |
| 6,381,644 B2 * | 4/2002 | Munguia et al. | 709/225 |
| 6,385,209 B1 | 5/2002 | Skirmont et al. |
| 6,389,119 B1 | 5/2002 | McBride |
| 6,393,476 B1 | 5/2002 | Barnhouse et al. |
| 6,400,820 B1 | 6/2002 | Edwards et al. |
| 6,404,746 B1 | 6/2002 | Cave et al. |
| 6,404,882 B2 | 6/2002 | Fellner et al. |
| 6,404,884 B1 | 6/2002 | Marwell et al. |
| 6,408,062 B1 | 6/2002 | Cave |
| 6,408,065 B1 | 6/2002 | O'Neal et al. |
| 6,411,697 B1 | 6/2002 | Creamer et al. |
| 6,411,704 B1 | 6/2002 | Pelletier et al. |
| 6,415,269 B1 | 7/2002 | Dinwoodie |
| 6,421,437 B1 | 7/2002 | Slutsman |
| 6,424,707 B1 | 7/2002 | Chatterjee |
| 6,430,175 B1 | 8/2002 | Echols et al. |
| 6,430,176 B1 | 8/2002 | Christie, IV |
| 6,430,289 B1 | 8/2002 | Liffick |
| 6,434,143 B1 | 8/2002 | Donovan |
| 6,442,242 B1 | 8/2002 | McAllister et al. |
| 6,446,127 B1 | 9/2002 | Schuster et al. |
| 6,449,260 B1 | 9/2002 | Sassin et al. |
| 6,452,932 B1 | 9/2002 | Christie |
| 6,456,618 B2 | 9/2002 | Kozdon et al. |
| 6,463,052 B1 | 10/2002 | Christie |
| 6,466,570 B1 | 10/2002 | Low et al. |
| 6,470,010 B1 | 10/2002 | Szviatovszki et al. |
| 6,473,429 B1 | 10/2002 | Christie |
| 6,480,484 B2 | 11/2002 | Morton |
| 6,480,581 B1 | 11/2002 | Wu et al. |
| 6,487,200 B1 | 11/2002 | Fraser |
| 6,493,337 B1 | 12/2002 | Stevenson, III |
| 6,493,437 B1 | 12/2002 | Olshansky |
| 6,496,477 B1 | 12/2002 | Perkins et al. |
| 6,504,921 B2 | 1/2003 | Kotik et al. |
| 6,510,219 B1 | 1/2003 | Wellard et al. |
| 6,519,232 B1 | 2/2003 | Becher |
| 6,519,333 B1 | 2/2003 | Malik |
| 6,539,077 B1 | 3/2003 | Ranalli et al. |
| 6,542,589 B1 | 4/2003 | Baskin |
| 6,553,023 B1 | 4/2003 | Yamamiya et al. |
| 6,564,261 B1 | 5/2003 | Gudjonsson et al. |
| 6,567,398 B1 | 5/2003 | Aravamudan et al. |
| 6,567,419 B1 | 5/2003 | Yarlagadda |
| 6,571,212 B1 | 5/2003 | Dent |
| 6,577,712 B2 | 6/2003 | Larsson et al. |
| 6,584,094 B2 | 6/2003 | Maroulis et al. |
| 6,584,098 B1 | 6/2003 | Dutnall |
| 6,584,186 B1 | 6/2003 | Aravamudan et al. |
| 6,584,510 B2 | 6/2003 | Anttila |
| 6,587,836 B1 | 7/2003 | Ahlberg et al. |
| 6,597,685 B2 | 7/2003 | Miloslavsky et al. |
| 6,614,786 B1 | 9/2003 | Byers |
| 6,614,899 B1 | 9/2003 | Sollee et al. |
| 6,621,899 B2 | 9/2003 | Dezonno et al. |
| 6,628,760 B2 | 9/2003 | Mirashrafi et al. |
| 6,633,561 B2 | 10/2003 | Christie |
| 6,636,506 B1 | 10/2003 | Fan |
| 6,650,890 B1 | 11/2003 | Irlam et al. |
| 6,665,294 B2 | 12/2003 | Christie |
| 6,665,389 B1 | 12/2003 | Haste, III |
| 6,665,392 B1 | 12/2003 | Wellner et al. |
| 6,668,055 B2 | 12/2003 | Marwell et al. |
| 6,681,252 B1 | 1/2004 | Schuster et al. |
| 6,690,780 B2 | 2/2004 | Kotik et al. |
| 6,694,007 B2 | 2/2004 | Lang et al. |
| 6,697,475 B1 | 2/2004 | McLampy et al. |
| 6,707,811 B2 | 3/2004 | Greenberg et al. |
| 6,707,906 B1 | 3/2004 | Ben-Chanoch |
| 6,711,160 B2 | 3/2004 | Chan et al. |
| 6,714,988 B2 | 3/2004 | Takemoto et al. |
| 6,718,031 B2 | 4/2004 | Fellner et al. |
| 6,724,755 B1 | 4/2004 | Kim |
| 6,731,630 B1 | 5/2004 | Schuster et al. |
| 6,731,642 B1 | 5/2004 | Borella et al. |
| 6,731,741 B1 | 5/2004 | Fourcand et al. |
| 6,741,586 B1 | 5/2004 | Schuster et al. |
| 6,748,057 B2 | 6/2004 | Ranalli et al. |
| 6,760,429 B1 | 7/2004 | Hung et al. |
| 6,763,226 B1 | 7/2004 | McZeal, Jr. |
| 6,765,931 B1 | 7/2004 | Rabenko et al. |
| 6,769,020 B2 | 7/2004 | Miyazaki et al. |
| 6,771,637 B1 | 8/2004 | Suzuki et al. |
| 6,775,368 B1 | 8/2004 | Lee et al. |
| 6,778,661 B1 | 8/2004 | Yumoto et al. |
| 6,798,771 B1 * | 9/2004 | Low et al. | 370/353 |
| 6,798,873 B2 | 9/2004 | Vardi et al. |
| 6,819,752 B2 | 11/2004 | Raniere et al. |
| 6,822,945 B2 | 11/2004 | Petrovykh |
| 6,839,323 B1 | 1/2005 | Foti |
| 6,839,359 B2 | 1/2005 | Skirmont et al. |
| 6,839,421 B2 | 1/2005 | Esparza et al. |
| 7,177,415 B1 | 2/2007 | Kim et al. |
| 7,418,509 B2 | 8/2008 | Koskelainen et al. |
| 7,450,565 B2 * | 11/2008 | Suotula et al. | 370/352 |
| 7,813,335 B2 * | 10/2010 | Terpstra et al. | 370/352 |
| 7,873,034 B2 * | 1/2011 | Tucker | 370/356 |
| 7,876,743 B2 * | 1/2011 | Garcia-Martin et al. | 370/352 |
| 7,957,517 B2 | 6/2011 | Ricciardi et al. |
| 8,099,089 B2 | 1/2012 | Sedlacek et al. |
| 2001/0005412 A1 | 6/2001 | Light et al. |
| 2001/0005415 A1 | 6/2001 | Grunsted et al. |
| 2001/0014919 A1 | 8/2001 | Tzirin |
| 2002/0007391 A1 | 1/2002 | Suzuki |
| 2002/0046279 A1 | 4/2002 | Chung |
| 2002/0049815 A1 | 4/2002 | Dattatri |
| 2002/0049860 A1 | 4/2002 | Koistinen |
| 2002/0055879 A1 | 5/2002 | Wengrovitz et al. |
| 2002/0095516 A1 | 7/2002 | Nada |
| 2002/0112073 A1 | 8/2002 | McLampy et al. |

(56) References Cited

U.S. PATENT DOCUMENTS

| | | |
|---|---|---|
| 2002/0114430 A1 | 8/2002 | Murata |
| 2002/0126818 A1 | 9/2002 | Cai et al. |
| 2002/0129131 A1 | 9/2002 | Yamashita |
| 2002/0150083 A1 | 10/2002 | Fangman et al. |
| 2002/0191635 A1 | 12/2002 | Chow et al. |
| 2003/0005280 A1 | 1/2003 | Bobde et al. |
| 2003/0041132 A1 | 2/2003 | Lim et al. |
| 2003/0043787 A1 | 3/2003 | Emerson, III |
| 2003/0053446 A1 | 3/2003 | Kwon |
| 2003/0095541 A1 | 5/2003 | Chang et al. |
| 2003/0095542 A1 | 5/2003 | Chang et al. |
| 2003/0108064 A1 | 6/2003 | Bilke et al. |
| 2003/0163526 A1 | 8/2003 | Clarisse et al. |
| 2003/0174695 A1 | 9/2003 | Lautenschlager et al. |
| 2003/0202504 A1 | 10/2003 | Dhara et al. |
| 2004/0028025 A1 | 2/2004 | Chang |
| 2004/0028207 A1 | 2/2004 | Kato |
| 2004/0039938 A1 | 2/2004 | Katz et al. |
| 2004/0057415 A1 | 3/2004 | Colson et al. |
| 2004/0114575 A1 | 6/2004 | Morita et al. |
| 2004/0148392 A1 | 7/2004 | Cotte |
| 2004/0190711 A1 | 9/2004 | Miyajima |
| 2004/0205209 A1 | 10/2004 | Wengrovitz et al. |
| 2004/0205777 A1 | 10/2004 | Zalenski et al. |
| 2004/0215770 A1 | 10/2004 | Maher, III et al. |
| 2004/0223606 A1 | 11/2004 | Enete et al. |
| 2004/0258021 A1 | 12/2004 | Kashimoto et al. |
| 2004/0258238 A1 | 12/2004 | Wong |
| 2004/0258239 A1 | 12/2004 | Gallant et al. |
| 2005/0018659 A1 | 1/2005 | Gallant et al. |
| 2006/0072526 A1 | 4/2006 | Rasanen |
| 2006/0153102 A1 | 7/2006 | Kuure et al. |
| 2006/0205436 A1 | 9/2006 | Liu et al. |
| 2007/0047529 A1 | 3/2007 | Ricciardi et al. |
| 2009/0017856 A1 | 1/2009 | Albertsson et al. |
| 2009/0286516 A1 | 11/2009 | Sedlacek et al. |
| 2010/0312832 A1 | 12/2010 | Allen et al. |

OTHER PUBLICATIONS

J. Rosenberg et al., Best Current Practices for Third Party Call Control (3pcc) in the Session Initiated Protocol (SIP); Network Working Group, Request for Comments: 3725, BCP: 85, Apr. 2004, 31 pages.
Johnston, A., et al. "SIP Call Flow Examples" IETF Standard-Working-Draft, Internet engineering Task Force (IETF), CH, vol. sip, No. 4 Apr. 2001, pp. 1-72, XP015027711, ISSN: 0000-0004, pp. 1-220.
Rosenberg, J., et al. "STUN—Simple Traversal of UDP Through Network Address Translators" IETF Standard-Working-Draft, Internet Engineering Task Force (IETF), CH, vol. midcom, No. 3, Oct. 14, 2002, XP015002624, ISSN: 0000-0004, pp. 1-44.
Mahy, R., et al. "STUN-aware NAT draft-simu-midcom-stun-aware-nat-00.txt" IETF Standard-Working-Draft, Internet Engineering Task Force (IETF), CH, Apr. 10, 2002, XP015005296, ISSN: 0000-0004, pp. 1-18.
Mahy, R., et al. "Pre-Midcom Requirements for Traversal of NATs for traffic not supported by STUN draft-mahy-midcom-premidcom-relay-reqs-00.txt" IETF Standard-Working-Draft, Internet Engineering Taskforce, IETF, CH, Feb. 200, XP015004271, ISSN: 0000-0004, pp. 1-8.
Fineberg, V. "A Practical Architecture for Implementing End-to-End QoS in a IP Network" Communications Magazine, IEEE vol. 40, Issue 1, Jan. 2002 pp. 122-130.
Melvin, H. et al. "Time Synchronization for VoIP Quality of Service", Internet Computing, IEEE vol. 6, Issue 3, May-Jun. 2002 pp. 57-63.
International Search Report and Written Opinion mailed Jul. 3, 2008 for PCT Application No. PCT/US06/09450.

\* cited by examiner

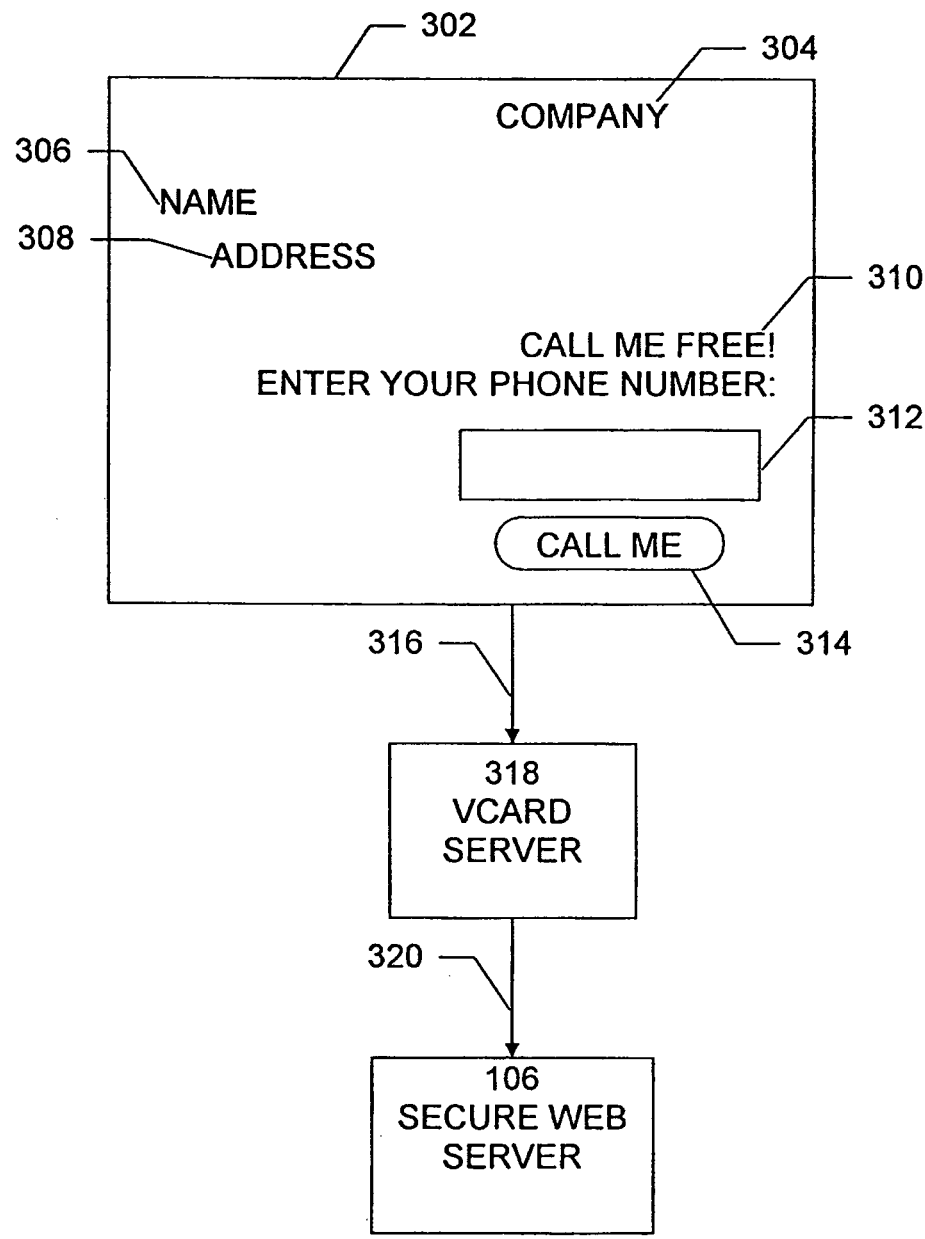

SYSTEM FOR EFFECTING A TELEPHONE CALL OVER A COMPUTER NETWORK WITHOUT ALPHANUMERIC KEYPAD OPERATION

CROSS-REFERENCE TO RELATED APPLICATION

This application is a continuation of U.S. Pat. No. 8,320, 543, issued Nov. 27, 2012, which is a continuation of U.S. patent application Ser. No. 11/081,174, filed Mar. 16, 2005. The aforementioned related patent applications are herein incorporated by reference.

BACKGROUND OF THE INVENTION

1. Field of the Invention

The present invention relates to a system for effecting a telephone call between telephonic devices. The present invention also relates to novel uses of a web browser and Internet capable software.

2. Description of the Related Art

Voice-over Internet Protocol (VoIP) is a category of hardware and software that enables the user to use a computer network such as the Internet as the transmission medium for telephone calls by sending voice data in packets using Internet Protocol (IP) rather than by traditional circuit transmissions of the Public Switch Telephone Network (PSTN). This eliminates circuit switching and the associated waste of bandwidth. Instead, packet switching is used, wherein IP packets with voice data are sent over the network only when data needs to be sent, i.e. when a party to the call is speaking.

The advantages of VoIP over traditional telephony include, by way example, lower costs per call, especially for long-distance calls, and lower infrastructure costs. That is, once the IF infrastructure is installed, no or little additional telephony infrastructure is required.

However, despite the technological flexibility of a VoIP system, callers are still limited to initiating calls manually, that is by using the keypad on a telephone.

There is an art desired need to greatly reduce or eliminate the user's manual activities in initiating a telephone call, including the telephone keypad operation.

OBJECTS AND SUMMARY OF THE INVENTION

It is therefore a principal object of the present invention to provide a system for effecting a telephone call between telephonic devices using a computer network without manual use of the telephonic device keypads.

The third party call control (3PCC) application program interface (API) of the present invention provides the capability for users to use a web browser or other Internet capable software to place a call. This eliminates using the telephone keypad. The open nature of the API also provides the capability to integrate 3PCC functionality with new or existing applications, such as customer relationship management (CRM), contact management applications, and the like.

In one embodiment of the present invention, a third party call control application program interface includes a first uniform resource locator operable over the Internet to cause a call or connection between a first telephonic device and a second telephonic device to be completed. The first uniform resource locator includes identification of the first telephonic device and identification of the second telephonic device.

In one aspect of the present invention, the first uniform resource locator may be generated on a computer system that is communicatively connected to the Internet. The call may be completed by initiating a call to the first telephone device and transferring the call, so as to complete the call, to the second telephone device, when the call to the first telephone device is answered. The call may be initiated to the first telephone device using the Session Initiation Protocol INVITE method. The call may be transferred to the second telephone device using the Session Initiation Protocol REFER method.

In one aspect of the present invention, the identification of the first telephonic device may include identification of a telephone number of the first telephone device and the identification of the second telephonic device may include a telephone number of the second telephonic device. The telephonic devices may be conventional telephones. However, the present invention contemplates any present or future telephonic device. The third party call control application program may further include identification of an account to be billed. The identification of the first telephonic device includes a telephone number of the first telephone device and the identification of the second telephonic device includes a telephone number of the second telephonic device. The identification of the account to be billed may include the telephone number of the first telephonic device, the telephone number of the second telephonic device, or the telephone number of a third telephonic device.

In one further aspect of the present invention, the third party call control application program may further include a second uniform resource locator operable over the Internet to obtain information identifying an account to be billed. The information identifying an account to be billed may also include at least one telephone number. At least one of the first uniform resource locator identification of the first telephone device and the first uniform resource locator identification of the second telephone device may include at least one telephone number obtained by the second uniform resource locator.

In a still further aspect of the present invention, the third party call control application program includes identification and password information; such information is authenticated and validated before the call is completed.

BRIEF DESCRIPTION OF THE DRAWINGS

FIG. 3 illustrates an example of a vcard implementing functionality of the present invention.

DETAILED DESCRIPTION OF THE PREFERRED EMBODIMENTS

The third party call control (3PCC) application program interface (API) of the present invention provides the capability for users to use a web browser or other Internet capable software to place a call. This eliminates using a keypad such as the alpha/numeric keypad on a conventional telephone. The open nature of the API also provides the capability to integrate 3PCC functionality with new or existing applications like customer relationship management (CRM), contact management applications, and the like.

Figure 1:
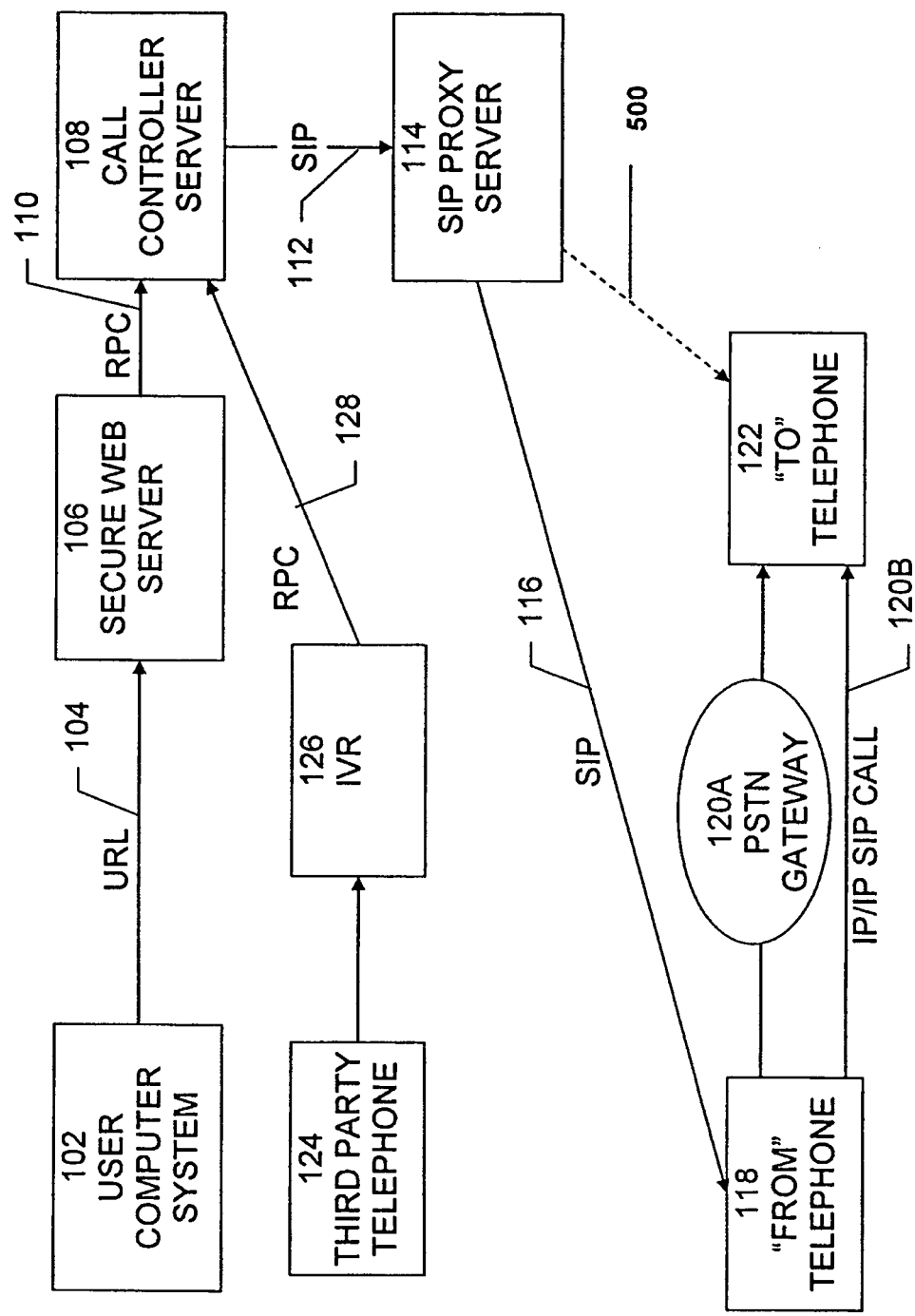
FIG. 1 is an exemplary block diagram of the system in which the present invention may be implemented.

A system in which the present invention may be implemented is shown in FIG. 1. In one embodiment, a user computer system 102 is used to access the Internet and invoke the 3PCC API using a secure hyper-text transfer protocol (HTTPS) uniform resource locator (URL) 104 (secure sockets layer (SSL)). The URL 104 is used to pass authorization credentials, such as login information, along with at least two phone numbers, a "from" number and a "to" number. An example of a suitable URL is:

```
https://secure.url.com/tpcc/makecall?username=aw&password=secret
&
    fromnumber=17325551111&tonumber=17325552222
```

This URL includes specification of the secure hyper-text transfer protocol (https:), the Internet address of web server 106 (secure.url.com), the action to be performed by web server 106 (makecall), the authorization credentials (username=aw&password=secret), the telephone number of the telephone from which the call is to originate (fromnumber=17325551111) and the telephone number of the telephone to which the call is to be completed (tonumber=17325552222).

The HTTP URL activates a secure web server 106, which authenticates the user and passes the information to a CallController system 108. Preferably, the information is passed from secure web server 106 to CallController 108 using a Remote Procedure Call (RPC) 110. The CallController 108 is a trusted peer of Session Initiation Protocol (SIP) proxy server 114.

SIP is a signaling protocol for Internet conferencing, telephony, presence, events notification and instant messaging. SIP provides the necessary protocol mechanisms so that end systems and proxy servers can provide services such as call completion, call forwarding, callee and calling "number" delivery, personal mobility, terminal-type negotiation and selection, terminal capability negotiation, caller and callee authentication, blind and supervised call transfer, invitations to multicast conferences.

A goal for SIP was to provide a superset of the call processing functions and features present in the public switched telephone network (PSTN). As such, features that permit familiar telephone-like operations are present: dialing a number, causing a phone to ring, hearing ringback tones or a busy signal. Implementation and terminology are different; for example, SIP refers to a device being in an "alerting state" rather than a "ringing."

In response to receiving the RPC 110 from secure web server 106, CallController 108 invokes a number of SIP methods 112 involving SIP proxy server 114. In response, SIP proxy server 114 invokes those SIP methods 116 to the appropriate target. In addition, SIP proxy server 114 monitors any calls that are initiated and completed, in order to handle the necessary billing functions.

In particular, CallController 108 initiates a call from CallController 108 to the "from" number, using the SIP INVITE method. SIP proxy server 114 in turn invokes the SIP INVITE method 116 targeting the "from" telephone 118. The technique used to invoke the SIP INVITE method depends upon the type of "from" telephone 118 involved. For example, if the "from" telephone 118 is an Internet Protocol (IP) telephone, the SIP MVITE method 120B may be invoked directly on the "from" telephone 118, since the IP telephone is capable of performing the necessary functions in response to the invocation of the SIP INVITE method. Alternatively, if the "from" telephone 118 is a standard Public Switched Telephone Network (PSTN) telephone, then the SIP INVITE method is invoked using a PSTN gateway server 120A to initiate the call. In either case, a call to the "from7' telephone 118 is initiated.

When the "from" telephone 118 answers, CallController 108 initiates a call transfer to transfer the call to the "from" telephone 118 from the origin of the call, CallController 108, to the "to" telephone 122 number, using the SIP REFER method. This terminates the initial call between the CallController and the "from" telephone 118, and triggers the "from" telephone 118 to initiate a new call to the "to" telephone 122. This call is billed to the appropriate account.

There are three possible numbers to which the call may be billed—the "from" number, the "to" number, or a third "billto" number. The number to which the call is billed must belong to a subscriber of the telephone service provider. Thus, if the "from" number belongs to the subscriber, the call is billed to the "from" number, if the "to" number belongs to the subscriber, the call is billed to the "to" number, if neither the "from" number nor the "to" number belong to the subscriber, a third number must be billed. This third number may be supplied in the URL 104 or it may be associated with the user name that was used to login. An example of a suitable URL including a "billto" number is:

```
https://secure.url.com/tpcc/makecall?username=aw&password=secret &
fromnumber=17325551111&tonumber=17325552222&
billtonumber=17325553333
```

Preferably, an additional HTTPS URL is exposed which allows an application to retrieve a list of phone numbers in a user's account. This URL passes authorization credentials (login information) and returns the phone numbers associated with the account corresponding to that login information. This list can be presented to the user to select which number is to initiate the call (the "from" number), and/or to select which number is to be billed for the call (the "billto" number).

Although, typically, user computer system 102 is used to initiate the telephone calls, calls may also be initiated from a third party telephone 124. Third party telephone 124 would dial into an interactive voice response (IVR) system 126 and would be used to enter the information needed to initiate the telephone call. IVR 126 would pass the information to CallController 108 using RPC 128. The system would then initiate the call in a manner similar to that for a call initiated from user computer system 102.

The third party telephone configuration slightly changes the role of "from" telephone 118, as compared to the configuration involving only the "to" and "from" telephones. Both "to" telephone 122 and "from" telephone 118 become the "to" telephones. If the third party places a call to "from" telephone 118, SIP proxy server 114 invokes sip invite methods 116, as discussed above. However, if third party telephone 124 is trying to reach "to" telephone 122, the inventive system may have an alternative and additional communication link 500 adaptively operable in response to invoking methods similar to sip invite methods 116 by Proxy Server 114.

As a further possibility, CALL CONTROLLER SERVER 108 can always directly call "to" telephone 122 using the link similar to communication link 500. One of possible scenarios involving such a direct connection may involve a situation when the caller operating the "from" telephone does not want experience any delays due to the busy line. Instructing the controller server to initiate contact with the "to" telephone and, once the operator of the "to" telephone answers the call from the controller server, actually connecting the "from" and "to" telephones may save the operator of the "from" telephone time.

The configuration of the inventive system involving third party telephone 124 may have numerous practical ramifications and be used in a variety of ways. For instance, one potential use of this is similar to a "calling card". The subscriber could initiate a call from any telephone, such as their hotel room telephone or a pay telephone, to any other phone, while billing the call to their own account.

Examples of users of the services provided by the present invention include business users who have a large phone book of users they need to call (e.g. sales calls), or by telemarketing operations. In this situation, the subscriber uses the "from" telephone and the calls are billed to the "from" number.

Figure 2:
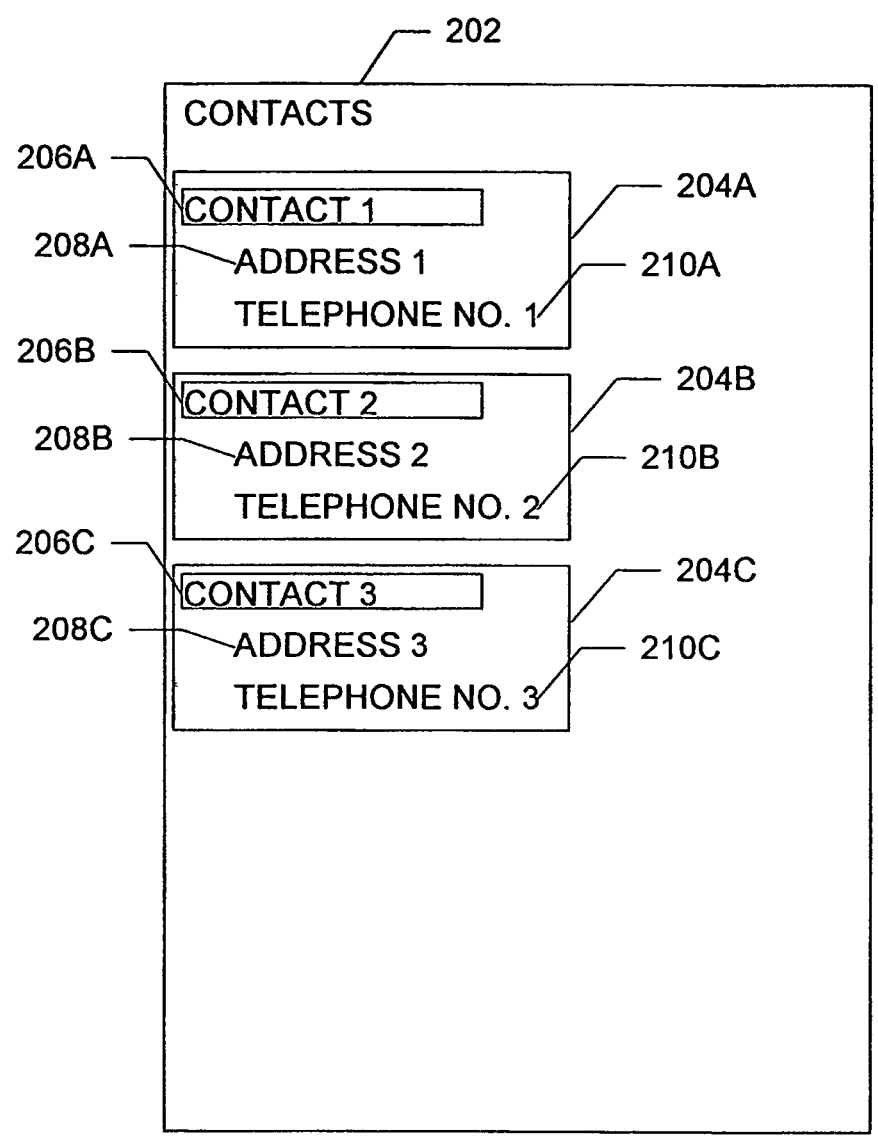
FIG. 2 is an exemplary diagram of an implementation of a contact list interface to functionality of the present invention.

For example, this could be implemented in phone or address book software, such as using a plug-in to an email program such as MICROSOFT OUTLOOK®, or in contact manager software. An example of such an implementation is shown in FIG. 2. In this example, a contacts window 202 includes a plurality of contacts entries 204A-C. Each contact entry 204A-C includes a contact address 208A-C and a contact telephone number 210A-C. Associated with each contact telephone number 210A-C is a software control, which, when activated, causes the telephone number 210A-C to be dialed using the third party call control system shown in FIG. 1. The software control may take any form. For example, the software control may be a button or an active area associated with the telephone number 210A-C. Alternatively, the software control may be a hotkey, which may operate, for example, by a user selecting a telephone number and then pressing the hotkey. These are merely examples of suitable software controls; any software control with adequate functionality may be used.

In order to dial the telephone number 210A-C using the third party call control system shown in FIG. 1, a URL, such as those shown above, is used. The telephone number 210A-C is included in the URL, typically as the "to" number. The "from" number would typically be the phone number of a phone available to the person initiating the call. The "billto" number may be omitted from the URL, in which case the "from" number would typically be billed, or a third "billto" number may be included in the URL.

Additional enhancement to this functionality include the capability to scan pages and documents for character strings that appear to be telephone numbers. These telephone numbers may be highlighted for the user. The user may then dial any such telephone number by selecting the number and pressing the hotkey or other software control.

Preferably, the implementation includes sufficient intelligence to understand the formats of telephone numbers, including international telephone numbers, as well as the ability to filter the characters in the telephone number to strip characters such as parentheses, hyphens, etc.

In another embodiment, subscribers are able to distribute software objects that provide the capability for the recipient of the object to call the subscriber. Typically, the software object is distributed using email, but it may be distributed by download or any form of electronic communications. An example of such a software object is shown in FIG. 3. In the example shown in FIG. 3, the software object is a virtual contact card or "vcard" 302. In this example, vcard 302 includes information such as a company name 304, the subscriber's name 306, the address 308, and instructions for initiating a call 310. In addition vcard 302 includes a field in which the recipient of the vcard is to enter their telephone number 312 and a software control 314, such as a button, that initiates the telephone call. The information provided, the company name 304, the subscriber's name 306, the address 308, and instructions for initiating a call 310, are merely examples and any desired information may be included in the vcard. Likewise, field 312 and software control 314 are merely examples of a software mechanism that may be used for operation of the vcard.

Included in or associated with vcard 302 and/or software control 314 is software that initiates a telephone call between the subscriber and the recipient of the vcard. When the recipient enters a telephone number in field 312 and activates software control 314, vcard 302 generates a URL and uses the URL to transmit information 316 to a vcard server 318. While the transmitted information 316 may include the identification and password information of the subscriber, preferably, transmitted information 316 does not include this information in an insecure form. For example, transmitted information 316 may include the identification and password information of the subscriber in an encrypted form, or transmitted information 316 may be a token that is used by vcard server 318 to obtain the identification and password information of the subscriber, such as by a database lookup.

Vcard server 318 receives the transmitted information 316 and generates a URL that is used to transmit information 320 to secure web server 106. This URL is similar to that generated by user computer system 102, shown in FIG. 1, which is used to communicate with secure web server 106. If the transmitted information 316 is encrypted identification and password information of the subscriber, vcard server 318 decrypts the information and uses it to generate the URL. If the transmitted information 316 is a token, vcard server 318 validates the token, then uses the token to obtain the identification and password information of the subscriber, such as by using the token to access a database that contains the identification and password information of the subscriber. In any case, the URL is used to transmit information 320 to secure web server 106, which initiated the telephone call in a manner similar to that shown in FIG. 1.

Typically, vcard 302 includes information such as the network address of vcard server 318, token and/or encryption information, and information identifying the sender of the vcard. Alternatively, vcard 302 could include a unique token that identifies the particular call setup to be initiated, but which does not itself include information that identifies the subscriber account involved. Of course, various modifications are possible, such as including the identification information, but not the password, etc.

In the example shown in FIG. 3, vcard 302 included field 312 in which the recipient of the vcard entered the telephone number to which the telephone call was to be completed. Alternatively, the sender of the vcard or other software object could specify a particular number to which the telephone call is to be completed. This would allow a subscriber to control the particular calls that can be made. For example, the subscriber could generate one software object that initiated a call from their grandmother's phone to the subscriber's phone, another software object that initiated a call from a friend's phone to the subscriber's phone, etc. This allows parties to initiate calls to the subscriber from their phone at any time, while billing the subscriber, the "to" number.

In addition, the sender of software object may be allowed to specify conditions for use of the software object. For example, the sender may specify that the software object expires after a particular date, the sender may specify time of day restrictions on the calls, the sender may restrict international calls, and the like. If the transmitted information is encrypted, this information may be included in the encrypted information. If the transmitted information is a token, the database may include the appropriate conditional information.

Although specific embodiments of the present invention have been described, it will be understood by those of skill in the art that there are other embodiments that are equivalent to the described embodiments. For example, the present invention may also be advantageously applied to three-way and/or multiple party conferencing. For three-way conferencing, the system shown in FIG. 1 would be used to initiate two calls to the same telephone. Typically, the first call would be completed to the telephone, the second call would be initiated, the telephone would receive a call waiting indication, and the second call would be conferenced in to the first. For multiple party conferencing, the system shown in FIG. 1 would be used to initiate multiple calls to a conference bridge, with all calls billed to the account of the conference organizer.

In addition, it is important to note that while the present invention has been described in the context of a fully functioning data processing system, those of ordinary skill in the art will appreciate that the processes of the present invention are capable of being distributed in the form of a computes readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission type media, such as digital and analog communications links.

Accordingly, it is to be understood that the invention is not to be limited by the aforesaid specific illustrated embodiments, but by the scope of the appended claims.

What is claimed is:

1. A method of telephone call completion comprising:
(a) displaying contact information comprising information relating to a telephone call that may be completed;
(b) receiving a uniform resource locator (URL) including call setup information having an indication of the telephone call to be completed from a first telephonic device to a second telephonic device, wherein the call setup information includes an identification of the first telephonic device and an identification of the second telephonic device;
(c) initiating a call to the first telephonic device or the second telephonic device using a session initiation protocol (SIP) INVITE method and the received call setup information;
(d) transferring the call using a SIP REFER method and the received call setup information in response to an answer of the call to establish the telephone call from the first telephonic device to the second telephonic device; and
(e) billing the telephone call to an appropriate account, wherein billing information is derived from a "bill to" number supplied in the URL.

2. The method of claim 1, wherein billing information is further derived from information consisting of a "from" number and a "to" number.

3. A non-transitory computer readable medium having stored thereon instructions that when executed by a processor cause the processor to perform a method of call completion comprising:
(a) displaying contact information comprising information relating to a telephone call that may be completed;
(b) receiving a uniform resource locator (URL) including call setup information having an indication of the telephone call to be completed from a first telephonic device to a second telephonic device, wherein the call setup information includes an identification of the first telephonic device and an identification of the second telephonic device;
(c) initiating a call to the first telephonic device or the second telephonic device using a session initiation protocol (SIP) INVITE method and the received call setup information;
(d) transferring the call using a SIP REFER method in response to an answer of the call to establish the telephone call from the first telephonic device to the second telephonic device and the received call setup information; and
(e) billing the telephone call to an appropriate account, wherein billing information is derived from a "bill to" number supplied in the URL.

4. The non-transitory computer readable medium of claim 3, wherein billing information is further derived from information consisting of a "from" number and a "to" number.

* * * * *